March 26, 1957  F. C. CALDWELL ET AL  2,786,318
MACHINE FOR CUTTING STALKS OR BRUSH
Filed Oct. 21, 1954  2 Sheets-Sheet 2
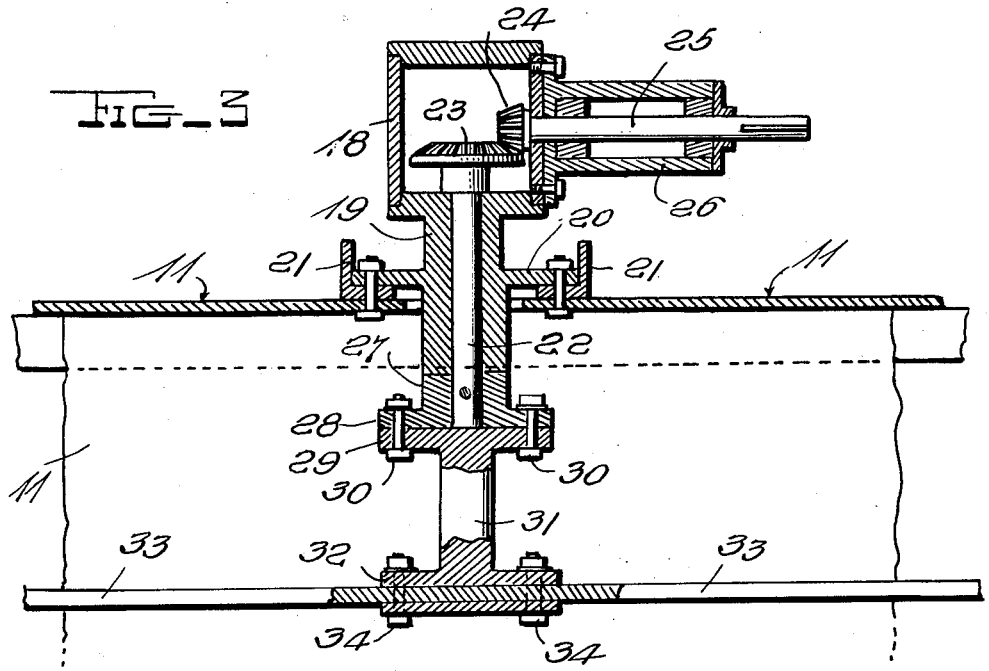
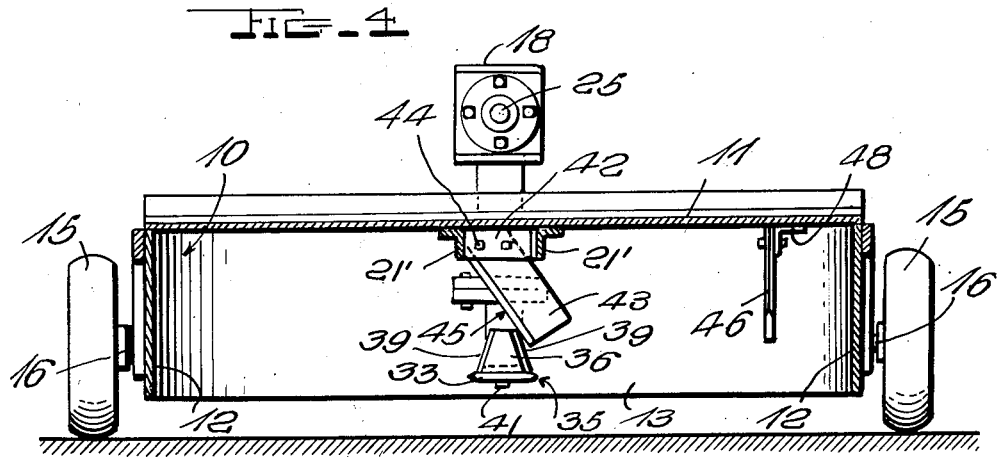
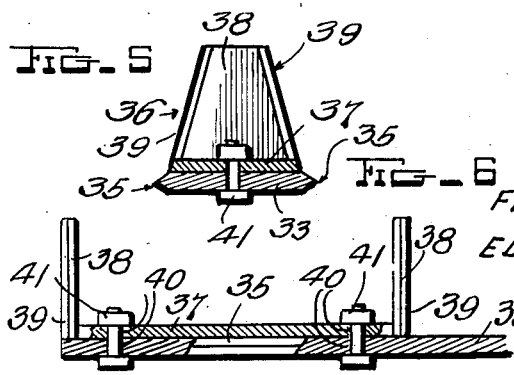
INVENTORS
FREDERICK CLAY CALDWELL,
EDWARD LASATER CALDWELL, Jr.
BY
ATTORNEY

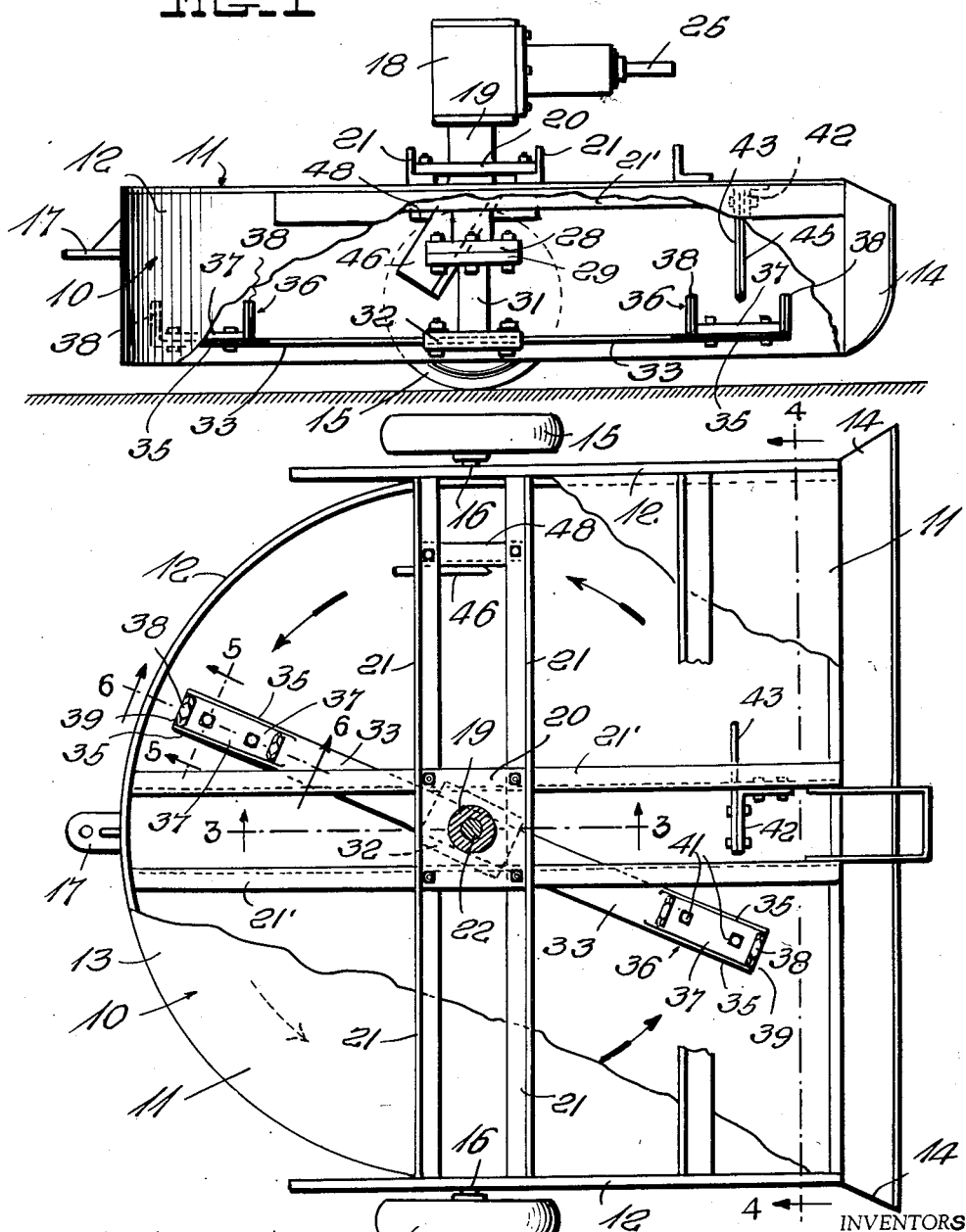

United States Patent Office 2,786,318
Patented Mar. 26, 1957

2,786,318

MACHINE FOR CUTTING STALKS OR BRUSH

Frederick Clay Caldwell and Edward Lasater Caldwell, Jr., Corpus Christi, Tex., assignors to E. L. Caldwell & Sons, Corpus Christi, Tex., a firm Application October 21, 1954, Serial No. 463,647

6 Claims. (Cl. 55—118)

The present invention relates to a machine for cutting stalks or brushes.

An important object of the invention is to provide a machine of the above-mentioned character, constructed to operate upon a plurality of rows of plants or the like at the same time.

A further object of the invention is to provide means to cut the stalks of the plants, and to also cut the branches and other parts of the plants, so that the plants are cut into relatively small parts.

A further object of the invention is to provide a cutting element which is in the nature of an attachment to be applied to a rotary cutting blade.

A further object of the invention is to provide upstanding blade or blades, mounted upon a horizontal rotatable blade, and projecting above the horizontal rotatable blade for coaction with stationary upstanding blade or blades.

A further object of the invention is to provide simple means for attaching the upstanding blade or blades to the horizontally rotatable blade.

Other objects and advantages of the invention will be apparent during the course of the following description.

In the accompanying drawings, forming a part of this application and in which like numerals are employed to designate like parts throughout same, Figure 1 is a side elevation of a machine embodying the invention, parts broken away, Figure 2 is a plan view of the same, parts broken away, and parts in section, taken on line 2—2 of Figure 1, Figure 3 is a longitudinal vertical section through the gear casing and associated elements, taken on line 3—3 of Figure 2, parts in elevation, Figure 4 is a transverse vertical section taken on line 4—4 of Figure 2, Figure 5 is a transverse section taken on line 5—5 of Figure 2, and, Figure 6 is a longitudinal section taken on line 6—6 of Figure 2.

In the drawings, where for the purpose of illustration is shown a preferred embodiment of the invention, the numeral 10 designates a casing, having a horizontal top 11, sides 12 and a closed rear end 13. The forward end of the casing is open and its sides flare outwardly, as shown at 14. The casing 10 is supported by wheels 15, carried by axles 16, shown as rigidly secured to the sides 12, although these axles may be vertically adjustably mounted upon the sides. A draft appliance 17 is secured to the forward end of the casing 10, as shown.

The numeral 18 designates a gear casing, rigidly mounted upon a vertical bearing 19, having a horizontal flange 20. This flange is mounted between transverse angle irons 21, arranged above and rigidly mounted upon the top 11, and the flange 20 is rigidly secured to the angle irons 21. The bearing 19 extends downwardly through an opening in the top 11 and has a vertical shaft 22 mounted therein, driven by a bevel gear 23, which is driven by a bevel gear 24, rigidly secured to a shaft 25. This shaft is journaled in the end of a sleeve 26, secured to the casing 18. The shaft 25 extends forwardly for suitable connection with the power take-off of the tractor.

A sleeve 27 is clamped to the lower end of the vertical shaft 22 and is provided with a disc 28, integral therewith, and this disc is connected with a companion disc 29 by bolts 30. Formed integral with the disc 29 is a coupling shaft 31, having a horizontal sleeve 32 integral with its lower end. This sleeve is rectangular in cross section and receives a horizontal rotatable blade 33, clamped there in by a bolt 34. The opposite edges of the blade 33 are sharpened, as shown at 35.

Cutting elements 36 are mounted upon the opposite ends of the blade 33. Each cutting element comprises a horizontal plate 37, provided at its opposite ends with vertical blades 38, rigidly secured thereto and preferably formed integral therewith. The blades 38 are at right angles to the plate 37 and extend above the same. The blades 38 taper upwardly and have their opposite inclined edges sharpened, as shown at 39. Each horizontal plate 37 is arranged between the sharpened edges 35, inwardly of the same, and the blades 38 extend above the blade 33. The blades 38 have their faces extending transversely of the blade 33 and circumferentially of the path of travel of the blade 33. The inclined edges 39 of the blades 38 tend to elevate the cut material. Each plate 37 and the blade 33 have openings 40 formed therein for receiving bolts 41, which clamp the plate to the blade 33, as shown.

Rigidly mounted upon one longitudinal angle iron 21' is a vertical bracket 42, in the form of an angle iron, and a center upstanding blade 43 is rigidly mounted upon the bracket 42 by bolts 44. The angle irons 21' are arranged beneath the top 11 and are rigidly secured thereto. These angle irons are arranged near and upon opposite sides of the central longitudinal axis of the casing 10. The center blade 43 is upstanding and is preferably slightly vertically inclined and has a sharpened edge 45. The center blade 43 is arranged adjacent to the central longitudinal axis of the casing 10 and arranged between the rows of plants, such as cotton plants. The blade 43 is stationary and has its faces extending transversely of the longitudinal axis of the casing 10 and the rows of plants. The numeral 46 designates an upstanding side blade, having a sharpened edge 47. This blade is vertically inclined in a rearward direction. The blade 46 is mounted upon an angle iron 48, mounted upon the transverse angle irons 21, as shown. The blade 46 is arranged near the side of the casing 10 and the outer side of the row of plants remote from the other row. The faces of the blade 46 extend longitudinally of the longitudinal axis of the casing 10. The pair of vertical blades 38 travel in circular paths near and upon opposite sides of the blades 43 and 46 and the blades 38 overlap the stationary blades during this travel. The inclined cutting edges 39 of the vertical blades 38 tend to elevate the cut plants and throw them into engagement with the stationary blades 43 and 46. The plates 37 terminate short of the cutting edges 35 of the straight continuous blade 33.

The operation of the apparatus is as follows:

The machine is drawn forwardly longitudinally of two rows of plants, and these rows are positioned upon the outer sides of the angle irons 21'. The blade 33 is rotating counter-clockwise, Figure 2. The blade 33 cuts the upstanding stalks of the plants or bushes and moves the same into contact with the upstanding blades 38. The blades 38 engage principally with the more-or-less horizontal branches of the stalks, and the inclined edges 39 tend to work the cut plants upwardly, and the severed plants are next moved into engagement with the stationary inclined upstanding center blade 43, and are further severed. The cut plants are further cut into small parts. This cutting action occurs while the blade 33 is traveling across the first row, and the blade 33 continues its rotation and acts in the same manner upon the plants in the next row, the stalks of which are severed and the severed plants picked up by the upstanding blades 38 and brought into contact with the stationary upstanding inclined blade 46, to be further severed. The same operation occurs when the oposite end of the blade 33 and its cutting element is brought to the forward position. It is obvious that the blade 33 and its cutting elements will sever the plants in two rows. As more clearly shown in Figures 1 and 4, the stationary blades 43 and 46 are received between the pairs of vertical blades 38, and the lower ends of the stationary baldes 43 and 46 extend below the upper ends of the vertical blades 38, and hence these blades vertically overlap.

It is to be understood that the form of the invention herewith shown and described is to be taken as a preferred example of the same and that various changes in the shape, size and arrangement of parts may be resorted to, without departing from the spirit of the invention or the scope of the subjoined claims.

Having thus described the invention, it is claimed:

1. A machine for cutting plants or brushes, comprising a traveling support, a generally horizontal rotatable blade mounted upon the support and having its opposite longitudinal edges sharpened, means to rotate the blade, plates mounted upon the upper face of said blade and having their longitudinal edges terminating short of the sharpened edges of said blade, spaced upstanding blades mounted upon each plate, the upstanding blades having sharpened leading edges and tapering upwardly, and upstanding stationary blades mounted upon the traveling support and having their edges sharpened, said stationary blades being circumferentially spaced with relation to the path of travel of the first-named blade and arranged between the paths of travel of the upstanding blades carried by said plates, the upstanding blades carried by said plates overlapping the stationary blades when the movable upstanding blades travel across the same.

2. A machine for cutting plants or brushes, comprising a traveling support, a generally horizontal substantially flat rotatable blade mounted upon the support and having its opposite longitudinal edges sharpended, means to rotate the blade, plates mounted upon the upper face of said substantially flat blade near to its opposite ends and having their longitudinal edges terminating short of the sharpened edges of said blade, substantially vertical blades mounted upon each plate, the substantially vertical blades being spaced longitudinally of said plate and having sharpened leading edges, and upstanding stationary blades mounted upon the traveling support and having sharpened edges, the stationary blades being circumferentially spaced with relation to the path of travel of the first-named blade and arranged between the paths of travel of the substantially vertical blades.

3. A machine for cutting plants or brushes, comprising a traveling support, a main substantially horizontal rotatable blade mounted upon the traveling support and having its longitudinal edges sharpened, means to rotate the blade, a plate mounted upon the blade near to one end thereof, upstanding blades mounted upon the plate and spaced longitudinally of the plate and radially of the main blade, the upstanding blades having their opposite edges sharpened, means to secure the plate upon the main blade so that the plate may be reversed upon the main blade, and an upstanding stationary blade mounted upon the traveling support and having a sharpened edge, the stationary blade being arranged between the paths of travel of the upstanding blades carried by the main blade.

4. A machine for cutting plants or brushes, comprising a traveling support, a main generally horizontal rotatable blade mounted upon the support to turn about a generally vertical axis, said main blade having a cutting edge, means to rotate said main blade about the generally vertical axis, a pair of generally vertical blades extending above and mounted upon said main blade near one end thereof and disposed upon the same side of said approximately vertical axis, said generally vertical blades being spaced radially of the main blade and rotatable therewith, and a generally vertical stationary blade mounted upon the traveling support and arranged above said main blade and disposed between the paths of travel of the generally vertical rotatable blades.

5. A machine for cutting plants or bushes, comprising a traveling support, a main generally horizontal rotatable blade mounted upon the support to turn about a generally vertical axis, said main blade having a cutting edge, means to rotate said main blade about the said generally vertical axis, a pair of generally vertical blades extending above and mounted upon the main blade near one end thereof and disposed upon the same side of said approximately vertical axis, said generally vertical blades being spaced radially of the main blade and rotatable therewith, said cutting edge of the main blade having a portion thereof disposed adjacent to said generally vertical rotatable blades and disposed between said generally vertical rotatable blades, and a generally vertical stationary blade mounted upon the traveling support and arranged above said main blade and disposed between the paths of travel of the generally vertical rotatable blades, said generally vertical stationary blade having its lower end arranged at an elevation below the upper ends of the generally vertical rotatable blades so that the generally vertical rotatable blades and the generally vertical stationary blade overlap during the rotation of said main blade, the arrangement being such that the main generally horizontal blade severs the upstanding stalks of the plants while the generally vertical rotatable blades coact with the generally vertical stationary blade to sever the generally horizontal branches of said plants.

6. A machine for cutting plants or brushes, comprising a traveling support, a main generally horizontal rotatable blade mounted upon the support to turn about a generally vertical axis, said main blade having a cutting edge, means to rotate the main blade about the generally vertical axis, a pair of generally vertical blades extending above and mounted upon the main blade near one end thereof and disposed upon the same side of said approximately vertical axis, said generally vertical blades being spaced radially of the main blade and rotatable therewith, said cutting edge of the main blade having a poition thereof disposed adjacent to said generally vertical rotatable blades and disposed between said generally vertical rotatable blades, said generally vertical rotatable blades having leading cutting edges which are inclined upwardly in a trailing direction, and a generally vertical stationary blade mounted upon the traveling support and arranged above said main blade and disposed between the paths of travel of the generally vertical rotatable blades, the arrangement being such that the main generally horizontal rotatable blade severs the upstanding stalks of the plants while the inclined cutting edges of the generally vertical rotatable blades tend to elevate the branches of the plants and said branches are severed by the generally vertical rotatable blades and the generally vertical stationary blade.

References Cited in the file of this patent
UNITED STATES PATENTS

| 2,192,762 | Vincze | Mar. 5, 1940 |
| 2,612,017 | Jarmin | Sept. 30, 1952 |
| 2,649,678 | Sishc | Aug. 25, 1953 |
| 2,651,159 | Rountree | Sept. 8, 1953 |
| 2,688,221 | Giesbrecht | Sept. 7, 1954 |
| 2,690,636 | Besse et al. | Oct. 5, 1954 |